Dec. 20, 1938.  E. R. LONG  2,140,916
MANUFACTURE OF METAL PRODUCTS
Filed March 27, 1937
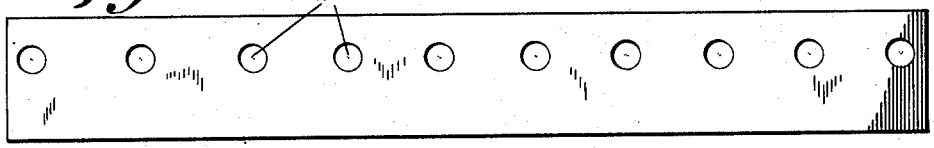
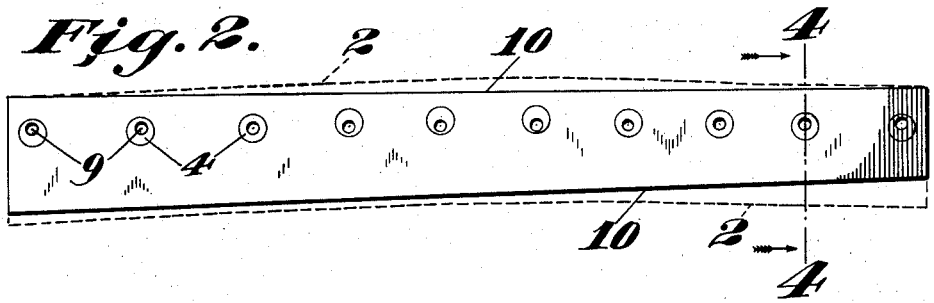
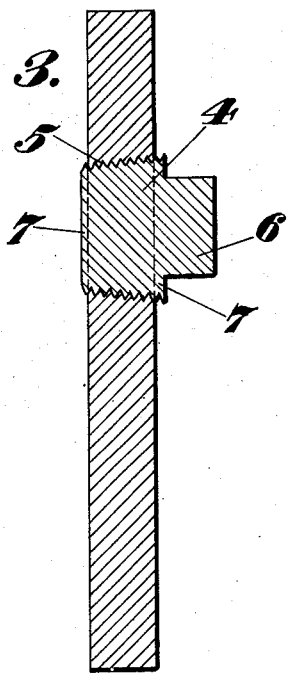
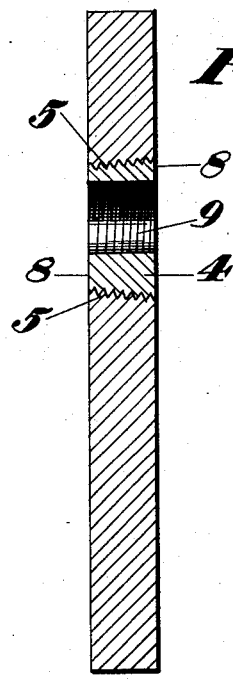
Inventor
E. R. Long.
By R. S. C. Dougherty
Attorney Patented Dec. 20, 1938

2,140,916

UNITED STATES PATENT OFFICE 2,140,916

MANUFACTURE OF METAL PRODUCTS

Edward R. Long, Bethlehem, Pa., assignor to Bethlehem Steel Company, a corporation of Pennsylvania Application March 27, 1937, Serial No. 133,311

4 Claims. (Cl. 76—104)

My invention relates to the manufacture of hardened metal articles which contain a plurality of accurately positioned holes, and is more particularly directed to the manufacture of hardened metal products which contain a plurality of inserts of softer metal in which such accurately positioned holes may be drilled.

The objects of my invention may be more fully understood when considered with reference to the manufacture of a specific article which embodies the principles of the invention.

In the manufacture of shearing machines it is customary to provide blades of hardened and tempered steel which are attached to the body of the machine by a plurality of bolts extending through the blade and the body of the machine. Because of the hardness of these blades it is extremely difficult, without undue expense and time, to drill the bolt holes in the blades after they have been hardened and tempered. Consequently, it is customary to drill the bolt holes in the blade before the blade has been subjected to the hardening process. The hardening process, however, especially when applied to long slender objects such as shear blades, often causes warpage or shrinkage of the blade, or, in some cases, a lengthening of the blade, with the result that the bolt holes which have been drilled therein prior to hardening no longer register with the holes in the head of the shearing machine. In some cases the holes may be reamed to fit, but more often the blade must be discarded as scrap.

The object of my invention is to provide a shear blade or other article of hardened metal having inserts or plugs of softer metal in which may be easily drilled such accurately positioned holes as may be required in the finished article.

Further objects of my invention will appear from reference to the following drawing and detailed description—

In the drawing:

Fig. 1 is a side elevation of a shear blade blank, in which have been drilled holes for the reception of the metal plugs hereinafter referred to;

Fig. 2 is a side elevation of a finished shear blade containing plugs or inserts of softer metal in which accurately positioned holes have been drilled.

Fig. 3 is a transverse section of the shear blade taken along the line 4—4 of Fig. 2, showing the plug of softer metal inserted therein;

Fig. 4 shows the same view of the blade as shown in Fig. 3, but with the softer metal insert machined flush with the surface of the shear blade, and drilled for the reception of a bolt.

In the practice of my invention as applied to the manufacture of shear blades I take a bar of steel of size and shape suitable for the manufacture of a shear blade. Such a piece of steel is shown in Fig. 1. Before hardening and tempering the bar I drill therein a plurality of accurately positioned holes 1. These holes are of a diameter greater than that of the bolt hole which is desired in the finished blade.

The diameter of such holes will vary with the amount of warpage and shrinkage which experience shows can be expected to occur in hardening a piece of metal of the particular size and shape being used. The diameter of such holes will vary with the amount of warpage, shrinkage and expansion which experience shows may be expected to occur in hardening a piece of metal of the particular size and shape being used. For example, I have found in practice that in the manufacture of a shear blade having a length of 170 inches the maximum lengthwise expansion or contraction of the blade which will occur is less than one inch, and that the maximum depth of any lengthwise warpage of such a blade is also less than one inch. Accordingly, with a shear blade of this length the maximum shrinkage, expansion or warpage of the blade may be compensated for by making the holes with a diameter one inch greater than that of the bolt holes required in the finished blade.

In the preferred form these holes are tapered and tapped as shown in Fig. 3, but it is to be understood that my invention is not limited to the particular form of hole shown in the drawing, and that such hole may be either tapered or straight and threaded or unthreaded.

Having drilled the holes in the bar as above described, I harden and temper the shear blade blank. As stated above, the hardening and tempering operations very frequently cause warpage, shrinkage or lengthening of the blade and I have shown such a warped blade by the dotted lines 2 in Fig. 2. It is of course obvious that as a result of such warpage the previously drilled and tapped holes 1 have been brought out of their previous alignment, and for that reason the blade would be useless under the old methods of manufacture.

My next step is to insert in the holes 1 plugs or inserts 4 of softer metal shown in Fig. 3. These are made with threads 5 to fit the previously tapped holes in the blade and have a head 6 which is so shaped that it may be gripped by a wrench for the purpose of screwing it tightly into the hole 1. Although the holes 1 may be somewhat distorted as a result of the hardening of the blade, it is obvious that the amount of such distortion will be insignificant and will in no case interfere with the insertion of the plugs 4. In practice, I make these plugs of steel containing approximately .15% carbon, which is sufficiently soft to accommodate itself to any distortion of the holes 1.

Having screwed the plug tightly into the hole, the plug is next machined in order to remove the head 6 and any protruding ends 7 and to bring the end surfaces thereof into alignment with the surfaces of the blade. These surfaces are shown at 8 in Fig. 4.

The bolt holes 9 may now be located within the area of the soft metal plugs. Although the warpage of the bar has resulted in a misalignment of the large holes 1 and the plugs 4, the relatively large size of the plugs permits considerable latitude in the laying out of the bolt holes, with the result that the effect of the warping of the blade due to hardening and tempering is negatived and the holes may be located in exact alignment with the corresponding holes in the head of the shearing machine. The holes 9 can then be drilled.

As the final step in the manufacture of the blade the edges thereof 10 are ground or machined to the desired shape and the irregularities therein, due to the warping of the blade, are removed. In Fig. 2, the dotted lines 2 show the blade in its warped condition and the lines 10 show the same blade after it has been ground to finished shape. It is apparent that although the plugs 4 have been forced out of line by the warping of the blade, the size of the plugs is sufficient so that the bolt holes 9 can be located completely within the area of the plugs.

Although I have described my invention as applied to the manufacture of a shear blade, I do not wish to be limited thereby since it is obvious that the process hereinabove described is applicable to the manufacture of any metal articles which are subject to warpage, shrinkage or lengthening as a result of heat treatment. Furthermore, while I have shown round holes through the blade receptive of the attaching means, it will be readily seen that recesses of various shapes may be formed in the blade to serve the same purpose without departing from the spirit of my invention.

Having thus described my invention, what I claim as new and desire to secure by Letters Patent is:

1. The method of manufacturing hardened metal articles containing accurately positioned holes which consists of forming in said articles holes of larger dimensions than those of the desired holes, subjecting the article to a hardening process, inserting plugs of relatively soft metal in said previously formed holes, and forming accurately positioned holes in said plugs.

2. The method of making blades for shearing machines which consists of taking a metal blank, forming a plurality of holes therein, subjecting said blank to a hardening process, inserting plugs of metal into said holes and forming a plurality of accurately positioned holes in said plugs.

3. The method of forming accurately positioned holes in metal articles which are subjected to a hardening process, which consists of locating such holes upon the article, forming at the points so located holes of larger dimensions than those desired in the finished article, subjecting the article to a hardening process, inserting plugs of relatively soft metal in said holes and locating and forming within the areas of such plugs accurately positioned holes.

4. A method of forming accurately positioned holes in a metal article which is subjected to a hardening process, which comprises forming in such article prior to the hardening thereof a plurality of holes of larger dimensions than those of the desired holes, inserting in said holes subsequent to the hardening of such article plugs of relatively soft metal, and forming accurately positioned holes in said plugs.

EDWARD R. LONG.